United States Patent
Jones et al.

[19]

[11] Patent Number: 6,124,645
[45] Date of Patent: Sep. 26, 2000

[54] ELECTRIC MOTOR ROTOR HOLDING ARRANGEMENT

[75] Inventors: Christopher Charles Jones; Timothy Michael Grewe, both of Endicott, N.Y.

[73] Assignee: Lockheed Martin Corporation, Johnson City, N.Y.

[21] Appl. No.: 09/192,645

[22] Filed: Nov. 16, 1998

Related U.S. Application Data

[60] Provisional application No. 60/066,741, Nov. 21, 1997.

[51] Int. Cl.[7] .............................. B60L 11/02; B61C 9/38
[52] U.S. Cl. .................................. 290/9; 290/9; 290/10; 290/13; 290/18; 290/22; 290/26; 290/31; 290/33; 290/36 A; 290/40 R
[58] Field of Search ......... 180/6 T, 9; 290/40 DD–40 F

[56] References Cited

U.S. PATENT DOCUMENTS

| | | | |
|---|---|---|---|
| 3,974,699 | 8/1976 | Morris et al. | 73/432 |
| 4,532,460 | 7/1985 | Gale et al. | 318/139 |
| 4,650,046 | 3/1987 | Parsons | 192/3 |
| 4,698,562 | 10/1987 | Gale et al. | 318/254 |
| 4,943,760 | 7/1990 | Byrne et al. | 318/701 |
| 5,057,760 | 10/1991 | Dadpey et al. | 318/807 |
| 5,828,201 | 10/1998 | Hoffman, Jr. et al. | 320/104 |

*Primary Examiner*—Elvin Enad
*Attorney, Agent, or Firm*—W. H. Meise; G. H. Krauss

[57] ABSTRACT

A hill-holding arrangement for an electrically driven vehicle includes a vehicle with a "gas pedal" which generates a torque command signal $T_{CMD}$. A switch (314) couples $T_{CMD}$ to a motor controller (316, 14) which drives the motor (40) and therefore the vehicle. When the "gas pedal" calls for zero torque, and the vehicle speed is zero, the switch responds to logic (FIG. 5), and substitutes a position-holding torque command signal $T_\theta$ for the operator-controlled torque command signal $T_{CMD}$. Position controlling torque command $T_\theta$ is generated by a controller (312) which receives a position signal representative of the angular position θ of the rotor. The position-holding torque control loop then produces such torque as may be required to prevent the rotor of the motor from moving from its commanded position.

4 Claims, 5 Drawing Sheets

6,124,645

ELECTRIC MOTOR ROTOR HOLDING ARRANGEMENT

This patent application claims priority of Provisional patent application Ser. No. 60/066,741 filed Nov. 21, 1997.

FIELD OF THE INVENTION

This invention relates to electric motor control for locking the rotor when motion is not desired, and more particularly to hill holding in an electrically driven vehicle.

BACKGROUND OF THE INVENTION

Environmental considerations make it desirable to make use of electrically operated vehicles. Such vehicles include one or more electrical traction motors coupled to the motive or drive wheels of the vehicle. The traction motor(s) are provided with electrical energy from an electrical source, which is generally a storage battery, or bank of storage batteries. The electrical energy provided to a traction motor is controlled by an operator in such a manner as to provide the desired amount of acceleration. The traction motors are preferably alternating-current motors, rather than direct-current motors, because direct-voltage motors tend to have limited brush life, and high-speed operation is difficult because of commutator limitations. However, driving an alternating-current motor from a battery requires a dc-to-ac inverter, to convert the direct voltage of the storage battery to alternating voltage which can be used by the alternating-current motor.

When an alternating-current motor is used as a traction motor, its rotational speed $\omega_m$ depends upon the frequency of the alternating voltage applied thereto. Since the traction motor is mechanically coupled to a wheel, possibly by a gear arrangement, the speed of the motor must be varied in order to vary the speed of the vehicle. Varying the speed of the vehicle, then, imposes a requirement that the dc-to-ac inverter have a variable alternating output voltage, established by the operator's controls. It should be noted that, since frequency (f) and angular rate ($\omega$) are related by a constant, they are used somewhat interchangeably herein, selecting that one which better fits the context.

SUMMARY OF THE INVENTION

An electric vehicle according to the invention includes wheels for at least driving the vehicle, and a motor including a rotor mechanically coupled to the wheels for, when energized, driving the wheels and the vehicle. The vehicle carries a source of electrical energy. An operator control acts as a source of motion command signals. A control loop is coupled to the source of motion command signals, to the source of electrical energy, and to the motor, for controlling the voltage and current applied to the motor in order to generate motor torque in response to the motion command signals. An arrangement is provided for causing the control loop to control the angular position of the rotor, instead of the torque of the motor, upon the concurrence of (a) motion command signals commanding zero motion of the vehicle and (b) zero velocity of the rotor; this arrangement is coupled to the control loop and to the source of motion command signals.

More particularly, a hill-hold arrangement for a vehicle includes a rotational driver for interacting with the environment of the vehicle for, when rotating, propelling the vehicle, and an electric motor including a rotor. The rotor is mechanically coupled to the rotational driver, for, when energized, rotating the rotational driver and thereby propelling the vehicle. A vehicle motive force command signal generator controllable by an operator generates a particular motive force command signal when vehicle motion is not desired. A controllable source of electrical drive is coupled to the command signal generator and to the motor, for controllably generating the electrical drive in response to the motive force command signal, for causing the motor to rotate with a selected torque in response to the electrical drive for controllably propelling the vehicle. As a result of propulsion of the vehicle in this manner, when the motive force command signal commands no motion, the controllable source of electrical drive does not produce any electrical drive, and the motor produces no torque. If the vehicle stops on a hill, the motor provides no retarding torque to prevent rolling of the vehicle. A position determining arrangement is coupled to one of the rotor and the rotational driver, for producing a motion signal representative of motion of the vehicle. A processor is coupled to the motive force command signal generator, to the position determining arrangement, and to the controllable source of electrical drive, for, during those periods when both (a) the motive force command signal commands no vehicle motion and (b) the motion of the vehicle is zero, commanding the controllable source of electrical drive to produce the electrical drive in a manner which produces sufficient torque in the motor to prevent motion of the vehicle.

DESCRIPTION OF THE INVENTION

Figure 1:
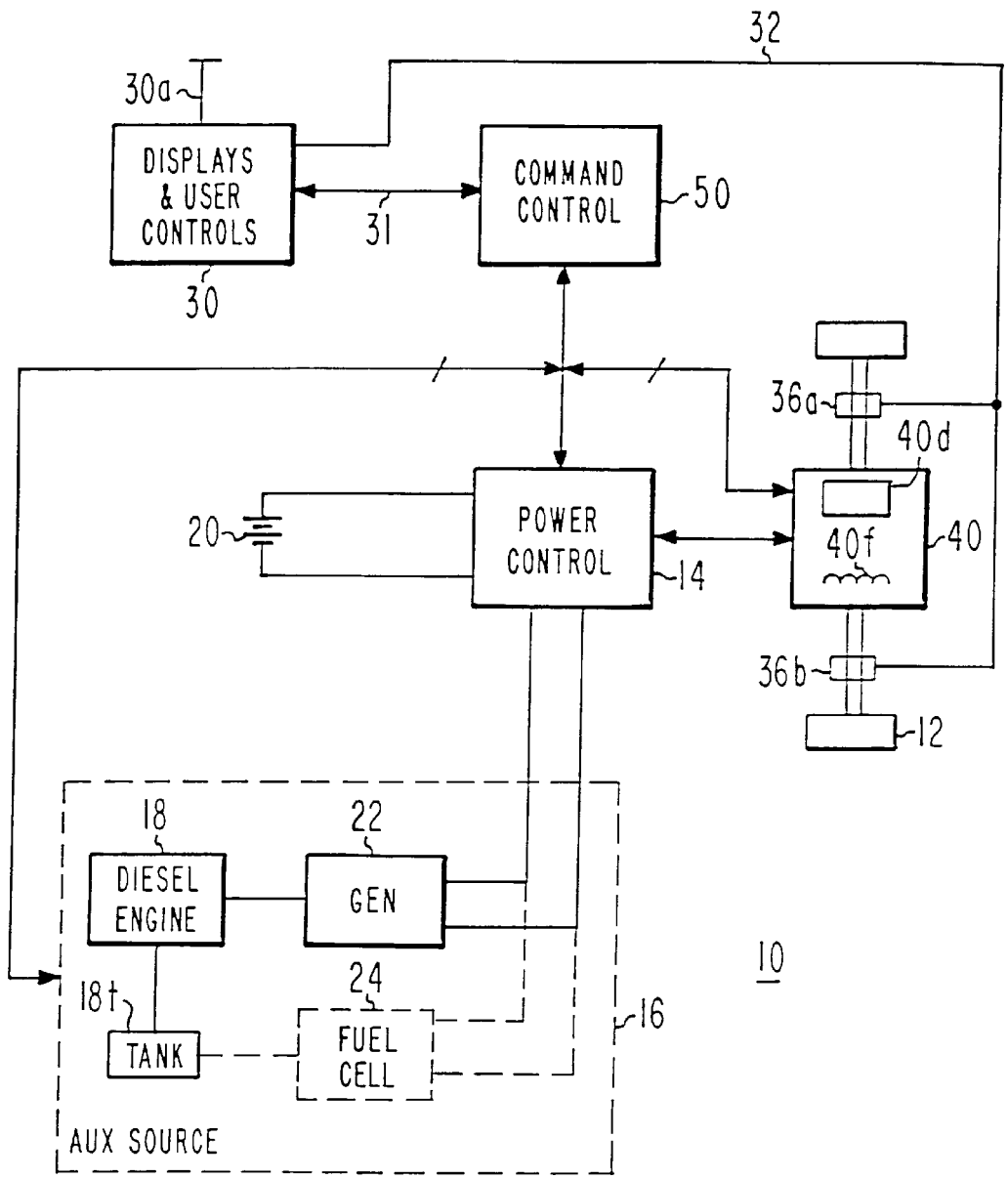
FIG. 1 is a simplified block diagram of an electric vehicle according to an aspect of the invention.

In FIG. 1, an electric vehicle 10 includes at least one drive wheel 12 connected to an alternating voltage electric traction motor 40, which in one embodiment of the invention is a three-phase alternating-current motor including a rotor 40r. Motor 40 is preferably a motor-generator, as known, so that kinetic energy of motion can be transduced into electrical energy during dynamic braking. A power controller 14 is connected by power-handling paths to traction motor 40, to a traction battery illustrated as 20, and to an auxiliary source of electrical energy illustrated as a block 16. As illustrated in block 16, the auxiliary source may include an internal combustion engine such as a diesel engine 18 driving an electrical generator 22, or it may include a fuel cell 24. A command controller illustrated as a block 50 is connected by means of information paths to power controller 14, auxiliary source 16, and to traction motor 40, for controlling the operation of the power controller 14, auxiliary source 16, and to traction motor 40 in accordance with appropriate control laws.

One of the most common and least expensive types of batteries which is capable of storing relatively high power includes the common lead/$H_2SO_4$ battery. This type of battery is suitable for use in an electric vehicle, if some care is taken to prevent application of a charging current thereto when the battery is at full charge, to prevent gassing of the electrolyte and undesired heat generation, and if sulfation can be avoided. Two copending patent applications Ser. Nos. 08/961,571 and 08/961,573, filed Oct. 30, 1997, in the name of Hoffman, Jr. and Grewe, and entitled *METHOD FOR EQUALIZING THE VOLTAGE OF TRACTION BATTERY MODULES OF A HYBRID ELECTRIC VEHICLE* and *METHOD FOR MAINTAINING THE CHARGE CAPACITY OF TRACTION BATTERY MODULES OF A HYBRID ELECTRIC VEHICLE*, now U.S. Pat. Nos. 5,869,950, issued Feb. 9, 1999 and 5,828,201, Oct. 27, 1998 respectively, describe control arrangements by which lead-acid batteries can be maintained to optimize their useful life and capacity, and describe various aspects of the care and use of such batteries.

In FIG. 1, the displays and operator controls of vehicle 10 are illustrated as a block 30. Block 30 is illustrated as being connected by a bidirectional data path 31 to command control block 50, for applying driving commands to command controller 50, which command controller 50 can then convert into appropriate commands to the various power elements, such as power controller 14, auxiliary source 16, and traction motor 40. Block 30 is also illustrated as being connected by a path 32 to friction brakes 36a and 36b, for direct control of the friction brakes by a conventional hydraulic braking system connected to a brake pedal.

Figure 2:
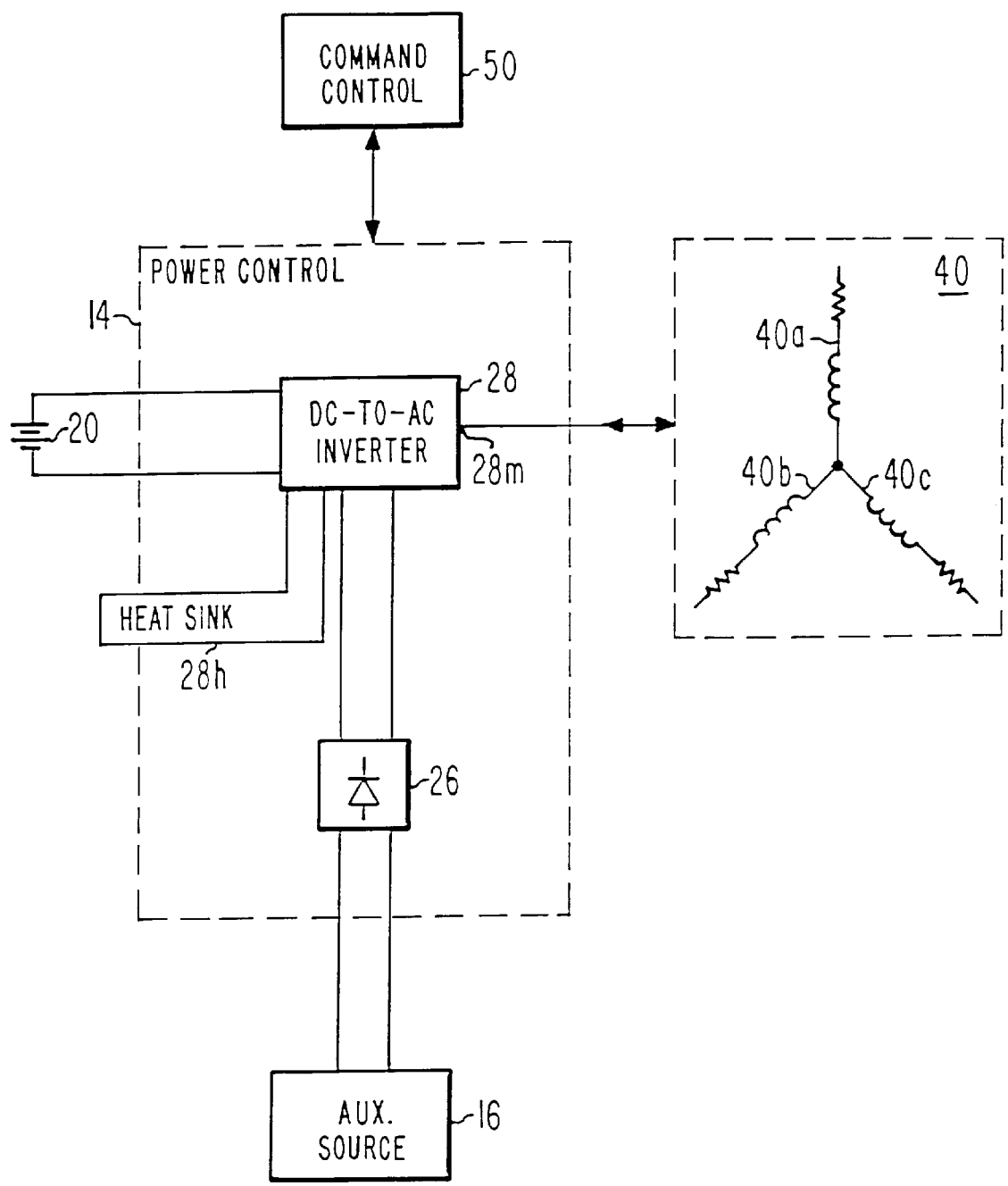
FIG. 2 is a simplified block diagram illustrating some details of the power controller of FIG. 1.

FIG. 2 represents the interconnection of some of the elements of power controller 14 of FIG. 1 with other elements of FIG. 1. More particularly, power controller 14 includes a rectifier arrangement 26 connected to auxiliary source 16, for (if necessary) converting alternating-current output of the auxiliary source 16 into direct voltage. Power controller 14 also includes a bidirectional propulsion control system, which further includes a dc-to-ac inverter 28 coupled by power connections to battery 20, to rectifier arrangement 26, and to traction motor 40. The operations of the inverter 28, the auxiliary source 16, and traction motor 40 are controlled, as mentioned above, by command controller 50. It should be noted that in addition to the dc-to-ac inverter 28, the propulsion control system includes voltage and current sensors, to sense the various operating parameters of the motor/generator, battery, and auxiliary electrical source.

In basic operation of the arrangement of FIGS. 1 and 2, the command controller (50) controls the individual switches (not illustrated) of inverter 28 with pulse-width-modulated commands, which result in the generation, at that port 28m of the inverter 28 which is coupled to the traction motor 40, of an approximation of an alternating voltage having a selected frequency and magnitude. In a preferred embodiment of the invention, the inverter is a field oriented command (FOC) type, and traction motor 40 is similarly an FOC induction motor. The frequency and magnitude of the commanded alternating current drive to the traction motor 40 are selected to drive the motor with a selected traction current at a selected motor speed. In general, traction motor 40 produces a back EMF which increases with increasing motor speed, and the inverter must produce (under the control of command controller 50) an alternating voltage which increases in magnitude with increasing alternating voltage frequency in order to maintain the same traction motor drive current. The motor rotates at a frequency consistent with the commanded frequency of the inverter output. Also in basic operation of an electric vehicle such as that of FIGS. 1 and 2, both dynamic braking and friction braking may be performed. The dynamic braking is much preferred, as the (kinetic) energy inherent in the motion of the vehicle is recaptured, by the traction motor operating as an electric generator, as the vehicle is slowed. During those intervals in which dynamic braking occurs, the dc-to-ac inverter 28 of FIG. 2, operating in a second or regenerating direction, converts the alternating voltage produced by the traction motor 40 into a direct voltage which charges traction battery 20. Further, when the electric vehicle is a hybrid electric vehicle, including the auxiliary electric source 16, the auxiliary source can be operated during operation of the vehicle to replenish the batteries and or to provide some of the traction energy, depending upon the commands of command controller 50.

Figure 3:
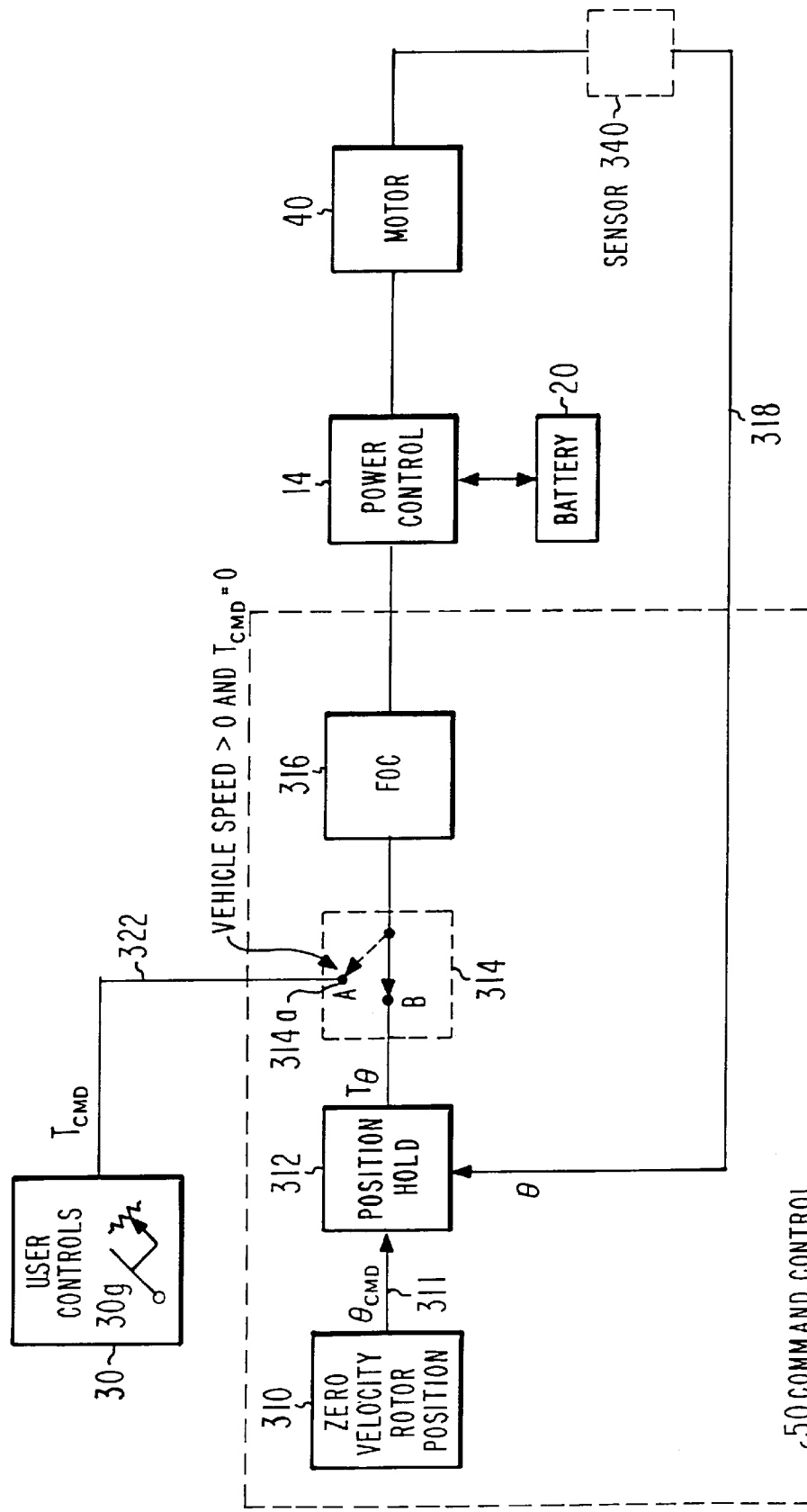
FIG. 3 is a simplified block diagram illustrating certain portions of the controller of FIG. 1 in accordance with an aspect of the invention.

FIG. 3 is a simplified block diagram illustrating the operation of controller 50 of FIG. 1 in accordance with an aspect of the invention. In FIG. 3, user control block 30 includes a "gas pedal" or accelerator control 30g (illustrated as including an electrical potentiometer), which the user commands in a conventional manner in order to produce command signals representing the desired motion of the vehicle. These command signals $T_{CMD}$ represent the torque desired from the motor 40. The command signals $T_{CMD}$ are applied over a signal path to a terminal 314a of a single-pole, double-throw switch 314. While switch 314 is illustrated by a symbol for a mechanical switch, those skilled in the art know that its electronic counterparts are meant. In the position of switch 314 illustrated by a dashed line, the command signals $T_{CMD}$ are coupled to a Field Oriented Controller (FOC) 316, illustrated as being a part of command controller 50. FOC controller 316 is a conventional type of motor controller, well known in the art. The command signals produced by FOC controller 316 includes pulse-width modulated inverter drive signals, which are applied to power controller 14 for generating the desired alternating-current waveform at the desired frequency. The FOC signals produced by controller 316 represent the voltages, currents, and frequencies which are required to generate the commanded torque from motor 40. The output alternating voltage from power control 14 is applied to motor 40, which produces torque.

As so far described, the operator's torque commands $T_{CMD}$ control the motor 40 in such a manner as to propel the vehicle with the desired acceleration. When the vehicle is to be stopped, the torque command signal is set to zero, by removing a foot from the "gas pedal," and the vehicle can then be braked to a stop, preferably dynamically, or with friction brakes. In a conventional vehicle propelled by an internal combustion engine alone, the torque converter in the automatic transmission may continue to provide torque when the vehicle is immobile, so that the operator may not be required to maintain braking to prevent vehicle motion on a hill. In an electric vehicle such as that as so far described, no torque is available from the traction motor when the operator does not command motion, because the torque commands $T_{CMD}$ are zero in that case. On a hill, the vehicle may tend to roll under the impetus of gravity, since the motor provides no torque. According to an aspect of the invention, the traction motor control loop is changed, under certain circumstances, from torque or voltage/current control in the "vehicle moving" mode of operation to a position control mode. In particular, the position control mode is entered when there is a concurrence or simultaneous occurrence of (a) the torque commands $T_{CMD}$ from the user controls are at a value representing zero torque, and (b) the vehicle or motor speed is zero. The advantage of this arrangement is that the vehicle control laws control the motor to supply the requested torque when the vehicle is moving; when the vehicle is allowed to coast toward a stop, or is actively braked toward a stop, the torque command signal $T_{CMD}$ is of necessity at zero, but the vehicle is still moving. When the vehicle speed reaches zero, the control laws switch over to position control, so that the commanded torque signal, which represents zero torque, is replace by a commanded position signal representing zero position change. This, in effect, readjusts the control laws in a manner which provides torque to hold the motor rotor in a fixed position.

In FIG. 3, the rotor angular position θ is determined by software determinations, or if not by software determinations then by a sensor illustrated in phantom as 340. However generated, a signal representing rotor angular position θ is coupled over a signal path 318 to command controller 50. The angular position θ of the rotor of motor 40 is coupled to a position holding arrangement illustrated as a block 312, which receives rotor rotational position signal θ from signal path 318 and a fixed zero-velocity rotor position signal, by way of a signal path 311, from a block 310. Position holding arrangement 312 produces position control signals which are substituted for the torque command signals applied to the FOC controller 316, to thereby produce the control signals for the power portions 14 of the vehicle which tend to hold the vehicle in position, without motion, up to the available motor torque.

Figure 4:
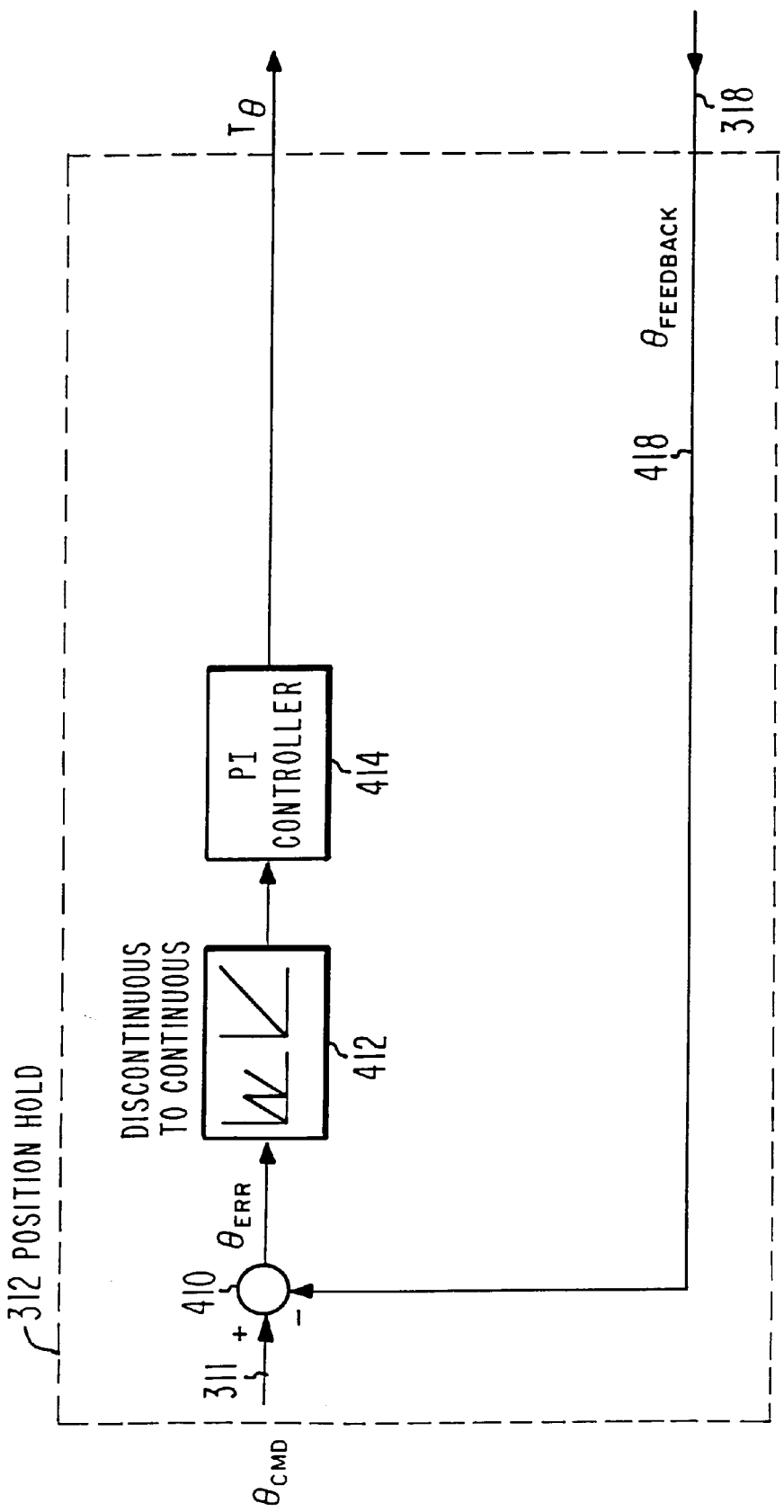
FIG. 4 is a simplified block diagram illustrating the principles of operation of a position holding portion of the arrangement of FIG. 3.

FIG. 4 is a simplified block diagram illustrating a portion of the control scheme for position holding or hill holding in accordance with an aspect of the invention. In FIG. 4, the commanded zero-position signal, which can be arbitrarily selected, is applied over signal path 311 to a noninverting (+) input port of a summer operated as an error signal generator 410. Summer 410 subtracts from the zero position signal applied to its noninverting input port a signal, representing the current rotor angular position θ, which is applied from feedback signal path 318, by way of a signal path 418, to the inverting (−) input port of the summer. The resulting rotor angular position error signal varies with the rotational position of the rotor. The rotor angular position error signal is applied from summing circuit 410 to block 412, which represents the conversion of recurrent cycles of rotational position into a long-term ramp position, representing angle over a plurality of rotations of the rotor of the motor 40. The angular position information is applied to a proportional-integral (PI) loop filter or controller, well known in the art from which a torque demand signal $T_θ$ is generated for application to terminal B of switch 314 of FIG. 3.

Figure 5:
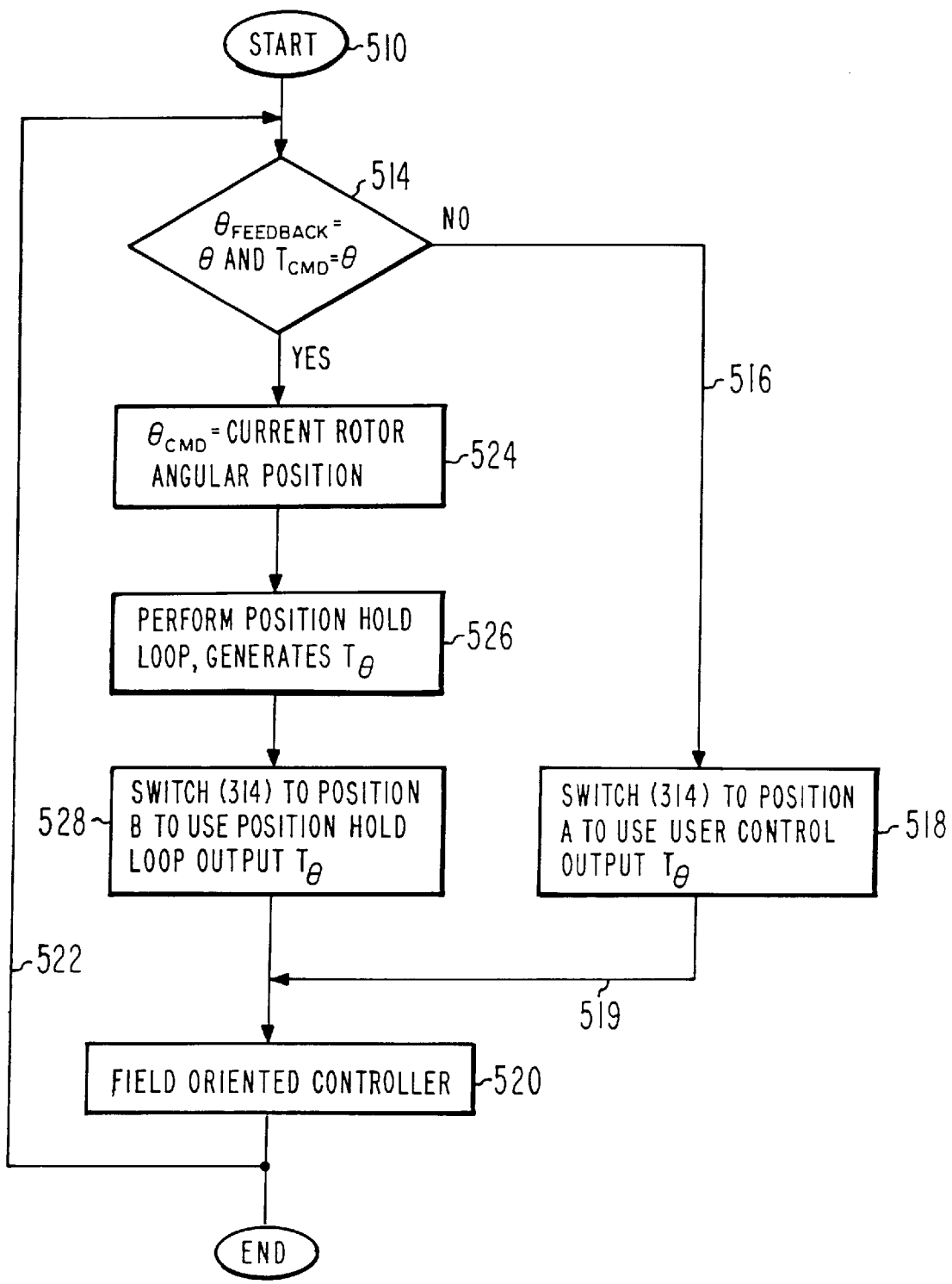
FIG. 5 is a simplified flow chart illustrating logic operations in the command controller for implementing a hill holding function.

FIG. 5 is a simplified flow chart which illustrates logic performed in the vehicle controllers for controlling the operation of the hill holding function. In FIG. 5, the logic begins at a START block 510, and proceeds to a decision block 514, which determines if both $θ_{FEEDBACK}$ and $T_{CMD}$ are zero. If not, the vehicle is not in a state in which hill holding is appropriate, and the logic leaves decision block 514 by the NO output, and proceeds by way of a logic path 516 to a block 518. Block 518 represents operation of switch 314 to connect the movable switch member to terminal A. This, it will be remembered, is the condition in which the "gas pedal" torque command $T_{CMD}$ controls the motor torque. The logic leaves block 518 and proceeds by way of a logic path 519 to a further block 520, representing application of the current value of torque command $T_{CMD}$ to the FOC controller 316 of FIG. 3. From block 520, the logic flows by way of a logic path 522 back to decision block 514, to begin another iteration through the logic of FIG. 5. The logic flow continues around the loop in the abovedescribed fashion until such time as the vehicle is intentionally stopped, at which time the "gas pedal" signal will represent zero torque, and the vehicle speed reaches zero. At the instant that the vehicle speed reaches zero, the logic leaves decision block 514 by the YES output, and reaches a block 524. Block 524 represents setting a logic variable $θ_{CMD}$ to equal the value at that moment of signal $θ_{FEEDBACK}$ of FIG. 4. From block 524 of FIG. 5, the logic flows to a block 526, which represents performance of the functions represented by FIG. 4, to produce the commanded torque $T_θ$ required to maintain the desired position θ. From block 526, the logic flows to a further block 528, which represents "throwing" switch 314 of FIG. 3 to its alternate position, in which the moving member contacts terminal B. This action couples the commanded torque $T_θ$, to the FOC controller 316, to implement the desired torque from the motor 40. From block 528 of FIG. 5, the logic flows by way of logic path 519 to block 520, which represents use of the torque command signal $T_θ$ by FOC controller 316.

Other embodiments of the invention will be apparent to those skilled in the art. For example, while a command signal may be said to be "zero," software is capable of interpreting a signal having a finite value as being zero.

Thus, an electric vehicle (10) according to the invention includes wheels (12) for at least driving the vehicle (10), and a motor (40) including a rotor (40r) mechanically coupled to the wheels (12) for, when energized, driving the wheels (12) and the vehicle (10). The vehicle (10) carries a source (16, 20) of electrical energy. An operator control (gas pedal 30g) acts as a source of motion command signals ($T_{CMD}$). A control loop (314, 316, 14, 40, 318, 320) is coupled to the source of motion command signals (30g), to the source (16, 20) of electrical energy, and to the motor (40), for controlling the voltage and current applied to the motor (40) in order to generate motor torque in response to the motion command signals ($T_{CMD}$). An arrangement (310, 312, 314) causes the control loop (314, 316, 14, 40, 318, 320) to control the angular position of the rotor, instead of the torque of the motor, upon the concurrence of (a) motion command signals commanding zero motion of the vehicle and (b) zero velocity of the rotor.

More particularly, a hill-hold arrangement for a vehicle (10) includes a rotational driver (wheels 12) for interacting with the environment (the underlying road) of the vehicle (10) for, when rotating, propelling the vehicle (10), and an electric motor (40) including a rotor (40r). The rotor (40r) is mechanically coupled to the rotational driver (12), for, when energized, rotating the rotational driver (12) and thereby propelling the vehicle (10). A vehicle (10) motive force command signal generator (30g) generates motive force command signals ($T_{CMD}$), and is controllable by an operator. The motive force command signal generator (30g) generates a particular motive force command (zero) signal when vehicle motion is not desired. A controllable source (14, 16, 20, 316) of electrical drive is coupled to the command signal generator (30g) and to the motor (40), for controllably generating the electrical drive in response to the motive force command signal, for causing the motor (40) to rotate with a selected torque in response to the electrical drive for controllably propelling the vehicle. As a result of propulsion of the vehicle in this manner, when the motive force command signal commands no motion, the controllable source of electrical drive does not produce any electrical drive, and the motor produces no torque. If the vehicle stops on a hill, the motor provides no retarding torque to prevent rolling of the vehicle. A position determining arrangement (including path 318) is coupled to one of the rotor (40r) and the rotational driver (14, 316), for producing a motion signal representative of motion of the vehicle. A processor (310, 312, 314, 316) is coupled to the motive force command signal generator (30g), to the position determining arrangement (316, 318, (software or 340)), and to the controllable source (14) of electrical drive, for, during those periods when both (a) the motive force command signal commands no vehicle motion and (b) the motion of the vehicle is zero, commanding the controllable source of electrical drive to produce the electrical drive in a manner which produces sufficient torque in the motor to prevent motion of the vehicle.

What is claimed is:

1. An electric vehicle, comprising:

wheels for at least driving said vehicle;

a motor including a rotor mechanically coupled to at least one of said wheels for, when energized, driving said wheels and said vehicle, said motor providing starting torque at all rotational positions;

a source of electrical energy:

a source of motion command signals;

a control loop coupled to said source of motion command signals, to said source of electrical energy, and to said motor, for controlling the voltage and current applied to said motor in order to generate the torque of said motor in response to said motion command signals; and means coupled to said control loop and to said source of motion command signals, for causing said control loop to control the angular position of said rotor, instead of the torque of said motor, upon the concurrence of (a) motion command signals commanding zero motion of said vehicle and (b) zero velocity of said rotor.

2. A hill-hold arrangement for a vehicle, said arrangement comprising:

rotational drive means for, when rotating, propelling said vehicle:

an electric motor including a rotor, said rotor being mechanically coupled to said rotational drive means, for, when energized, rotating said rotational drive means and thereby propelling said vehicle, said electric motor providing starting torque at all rotational positions:

a motive force command signal generator, which generates a particular motive force command signal when vehicle motion is not desired;

a controllable source of electrical drive coupled to said command signal generator, and coupled to said motor, for controllably generating said electrical drive in response to said motive force command signal, for causing said motor to rotate with a selected torque in response to said electrical drive for controllably propelling said vehicle, as a result of which, when said motive force command signal commands no motion, said controllable source of electrical drive does not produce said electrical drive, and said motor produces no torque, as a further result of which, when said vehicle is stopped on a hill, said motor provides no retarding torque to prevent rolling of said vehicle;

position determining means coupled to one of said rotor and said rotational drive means, for producing a motion signal representative of motion of said vehicle:

processing means coupled to said motive force command signal generator, to said position determining means, and to said controllable source of electrical drive, for, during those periods when both (a) said motive force command signal commands no vehicle motion and (b) said motion of said vehicle is zero, commanding said controllable source of electrical drive to produce sufficient torque in said motor to prevent motion of said vehicle.

3. An electric vehicle, comprising:

wheels for at least driving said vehicle;

a motor including a rotor mechanically coupled to at least one of said wheels for, when energized, driving said wheels and said vehicle;

a source of electrical energy:

a source of motion command signals;

a control loop coupled to said source of motion command signals, to said source of electrical energy, and to said motor, for controlling the voltage and current applied to said motor in order to generate the torque of said motor in response to said motion command signals; and means coupled to said control loop and to said source of motion command signals, for causing said control loop to control the angular position of said rotor to remain at any rotational position which said rotor may take at the concurrence of (a) motion command signals commanding zero motion of said vehicle and (b) zero velocity of said rotor.

4. A hill-hold type arrangement for a vehicle, said arrangement comprising:

rotational drive means for, when rotating, propelling said vehicle:

an electric motor including a rotor, said rotor being mechanically coupled to said rotational drive means, for, when energized, rotating said rotational drive means and thereby propelling said vehicle:

a motive force command signal generator, which generates a particular motive force command signal when vehicle motion is not desired;

a controllable source of electrical drive coupled to said command signal generator, and coupled to said motor, for controllably generating said electrical drive in response to said motive force command signal, for causing said motor to rotate with a selected torque in response to said electrical drive for controllably propelling said vehicle, as a result of which, when said motive force command signal commands no motion, said controllable source of electrical drive does not produce said electrical drive, and said motor produces no torque, as a further result of which, when said vehicle is stopped on a hill, said motor provides no retarding torque to prevent rolling of said vehicle;

position determining means coupled to one of said rotor and said rotational drive means, for producing a motion signal representative of motion of said vehicle:

processing means coupled to said motive force command signal generator, to said position determining means, and to said controllable source of electrical drive, for, during those periods when both (a) said motive force command signal commands no vehicle motion and (b) said motion of said vehicle is zero, commanding said controllable source of electrical drive to produce sufficient torque in said motor at any rotational position in which said rotor happens to be located at the commencement of said periods, to thereby prevent motion of said vehicle.

\* \* \* \* \*